United States Patent [19]

Sweaton

[11] Patent Number: 5,532,894
[45] Date of Patent: Jul. 2, 1996

[54] OVERVOLTAGE PROTECTION CIRCUIT

[75] Inventor: Michael C. Sweaton, Austin, Tex.

[73] Assignee: Minnesota Mining and Manufacturing Company, St. Paul, Minn.

[21] Appl. No.: 273,239

[22] Filed: Jul. 11, 1994

[51] Int. Cl.$^6$ .................................................. H02H 7/04
[52] U.S. Cl. ........................... 361/18; 307/43; 323/251; 363/65
[58] Field of Search ..................... 361/18; 307/50, 307/43; 363/23, 65, 93; 323/247–253

[56] References Cited

U.S. PATENT DOCUMENTS

| | | | |
|---|---|---|---|
| 3,818,321 | 6/1974 | Willner et al. | 323/43.55 |
| 4,745,352 | 5/1988 | McGuire | 323/263 |
| 4,815,052 | 3/1989 | Walker | 363/87 |
| 4,914,540 | 4/1990 | Tabata et al. | 361/91 |
| 4,916,085 | 4/1990 | Frisina | 437/44 |
| 5,122,726 | 6/1992 | Elliott et al. | 323/272 |
| 5,130,883 | 7/1992 | Edwards | 361/91 |
| 5,225,958 | 7/1993 | Nakamura | 361/55 |
| 5,233,497 | 8/1993 | Bremond | 361/56 |
| 5,235,489 | 8/1993 | Iannuzo | 361/56 |
| 5,243,205 | 9/1993 | Kitagawa et al. | 257/173 |
| 5,243,488 | 9/1993 | Bernier et al. | 361/56 |
| 5,245,499 | 9/1993 | Senes | 361/56 |
| 5,248,517 | 9/1993 | Shrier et al. | 427/58 |
| 5,272,592 | 12/1993 | Harris et al. | 361/637 |

Primary Examiner—A. D. Pellinen
Assistant Examiner—Michael J. Sherry
Attorney, Agent, or Firm—Gary L. Griswold; Walter N. Kirn; Jack V. Musgrove

[57] ABSTRACT

A power supply is provided for a presentation system having a light source which allows for overdriving of the light source, but protects against transient surges on the input line when overdriving the light source. The power supply includes an input line connected to the external ac source, two output lines, and a relay selectively connecting the input line to one of the two output lines. The relay is indirectly controlled by a voltage sense circuit which converts the ac source voltage to a dc output voltage. The dc output voltage is examined to determine whether the input line is in a low- or high-voltage state, the high-voltage state corresponding to a surge on the line. The output lines are coupled to the load line (leading to the light source) in such a manner that the ac voltage source, when applied to the first output line, will produce a lower voltage at the lamp than that produced when the ac voltage source is applied to the second output line, thus overdriving the lamp when the relay connects the input line to the second output line. As long as the input line is not surging, i.e., while it is in the low-voltage state, the relay connects the input line to the second output line to allow for overdriving. When a surge is detected, the relay switches the input line to the first output line. The voltage sense circuit includes a hysteresis component which automatically adjusts the predetermined threshold to prevent constant switching of the voltage sense circuit output when there are only minor deviations in the voltage near the threshold.

19 Claims, 5 Drawing Sheets

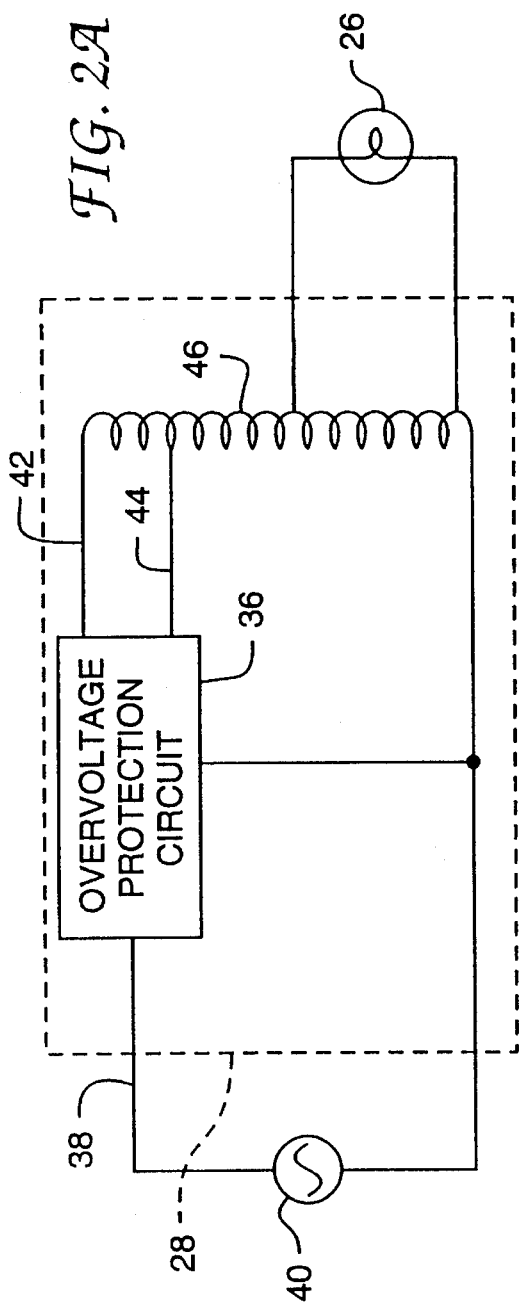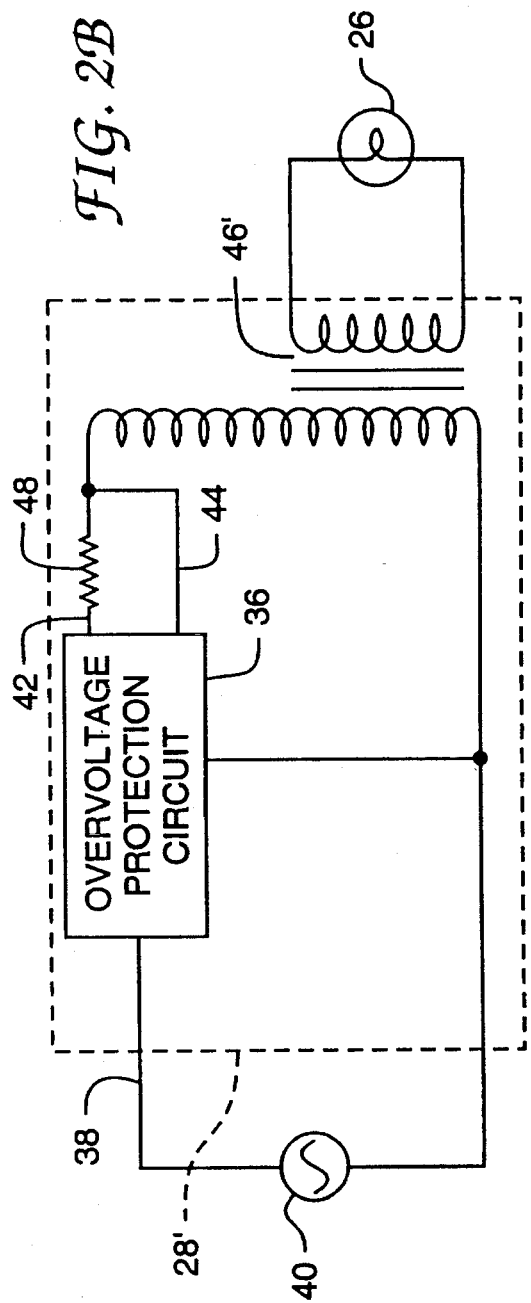

OVERVOLTAGE PROTECTION CIRCUIT

BACKGROUND OF THE INVENTION

1. Field of the Invention

The present invention generally relates to power control for electrical devices, and more particularly to an overvoltage protection circuit particularly useful in overdriving light sources such as a lamp for an overhead projector.

2. Description of the Prior Art

Overhead projectors (OHP's) are known in the art, and generally include a base having a light source, a transparent stage above the light where an image-bearing transparency is laid, and a projection head which collects light passing through the transparency and projects in on a wall or screen. It is desirable to provide a high-intensity light source to ensure that the projected image is sharp and the colors vivid; this also allows more light to be present in the room, for the audience to read other materials. Light intensity has become even more important with the use of liquid crystal display (LCD) panels in conjunction with OHP's, since these panels use polarizers which greatly diminish the intensity of the light passing therethrough.

For a given OHP system, there are basically two methods of improving overall brightness of the projected image, namely, increasing the amount of light from the light source, or collecting the light more efficiently toward the stage. With respect to the former method, there are several techniques which allow for the production of more light at the light source. These include (i) providing multiple light sources whose output is combined, (ii) using different types of light sources, such as halogen or arc lamps, and (iii) overdriving the lamp (i.e., exceeding the nominal manufacturer's rated voltage). Of course, these approaches may all be used together. If the latter of these techniques is used, however, it presents a greater risk of lamp failure since a minor fluctuation in the power source (a transient increase in the ac voltage), can cause the lamp to be overdriven too much.

For example, a conventional EVD incandescent halogen lamp has a maximum manufacturer's voltage rating of 36 volts, and a "kill" voltage of about 40 volts (i.e., a 40 volt surge will burn out the lamp's filament). With a typical external electrical ac source (120 volts rms) the amplitude may deviate ±10% within accepted limits, so a conventional power supply/regulator in an OHP might generate a lamp voltage of up to 39.6 volts, pushing the limits of the lamp, but still under the kill voltage. If, however, the lamp is already overdriven, say at 38 volts, then such a surge would push the lamp voltage above the kill voltage, in all likelihood burning out the filament. Although overdriving the lamp can shorten its life, this may certainly be an acceptable compromise for increased luminosity, as long as the lamp could survive the transient surges.

While there are a variety of conventional overvoltage protection methods, prior art projection systems lack any overvoltage protection for overdriven light sources. Indeed, there presently are no such commercially available overdriven OHP's, due in part to the difficulty of providing proper overvoltage protection. The lack of such protection is due to the inability (or commercial unfeasibility) to use existing circuits in a system wherein an ac voltage is to be regulated, and in such a manner that allows overdriving of the voltage. For example, many prior art protection circuits are limited to regulation of dc output voltage. U.S. Pat. No. 4,815,052 describes an automatic overvoltage protection circuit for a system wherein a dc power supply is generated from a variable-speed three-phase alternator. The system uses three sets of silicon-controlled rectifiers (SCR's) to adjust firing signals for a gated, three-phase rectifier bridge. U.S. Pat. No. 4,916,085 depicts integrated overvoltage protection in a metal-oxide semiconducting (MOS) power structure. The emitter, collector and base of a conventional bipolar transistor are connected, respectively, to the gate, drain and source of the MOS cell; a zener diode may additionally used as an overvoltage blocking diode;. U.S. Pat. No. 4,914,540 discusses overvoltage protection for a switching element wherein a MOSFET has a parasitic capacitance providing high frequency shorting across the switch. In U.S. Pat. No. 5,122,726, protection is provided to a bank of redundant, parallel power supplies, by removing any power supply which has failed, including failures wherein the output bus (dc) is driven to an overvoltage condition. U.S. Pat. No. 5,130,883 discloses another invention relating to overvoltage protection for semiconducting devices, such as fieldeffect transistors (FET's). In that construction, the circuit switches from the input line to a capacitor which maintains the bias on the gate of the FET without exposing it to the surge. The apparatus of U.S. Pat. No. 5,225,958 uses a combination of relays and diodes to alleviate excess voltage on CCD elements. U.S. Pat. No. 5,233,497 illustrates a circuit which achieves overvoltage protection by using zener diodes and an SCR (or thyristor) to clip low-energy overvoltage pulses and short high-energy pulses; see also U.S. Pat. Nos. 5,243,488, 5,245,499 and 5,243,205. A parasitic SCR equivalent is shown in U.S. Pat. No. 5,235,489, which provides a controllable breakover voltage for the supply line voltages on a semiconductor substrate. None of the foregoing designs are readily adapted to powering an ac lamp. It would, therefore, be desirable and advantageous to devise a power supply for an OHP lamp which allows overdriving of the lamp, yet still protects against overvoltages which might, in combination with overdriving, push the lamp past its kill voltage.

SUMMARY OF THE INVENTION

The present invention provides a presentation system generally comprising an overhead projector having a base, a stage area, a light source, optics mounted on said base including means for collecting light from the stage area and projecting the collected light, and a novel power supply for the light source, the power supply including means for overdriving the light source, and an overvoltage protection circuit to guard against transient surges or sustained high ac line conditions during overdriving. The overvoltage protection circuit includes a relay which is used to connect the incoming ac voltage to one of two output lines. These output lines are coupled to the load line (leading to the OHP lamp) in such a manner that the ac voltage source, when applied to the first output line, will produce a lower voltage at the lamp than that produced when the ac voltage source is applied to the second output line, thus overdriving the lamp when the relay connects the input line to the second output line. The coupling of these lines is conveniently achieved using a transformer with multiple taps. The relay is indirectly controlled by a voltage sense circuit which converts the incoming ac voltage into a dc output voltage and then compares the dc output voltage to a predetermined threshold. In the preferred embodiment, the voltage sense circuit includes a hysteresis component which automatically adjusts the predetermined threshold to prevent constant switching of the voltage sense circuit output when there are only minor deviations in the voltage near the threshold. The output of the voltage sense circuit is bipolar, indicating either a low- or high-voltage state on the input line. A first set of jumpers are used to manually adjust the threshold voltage based on the standard voltages available in different countries. Another set of jumpers and a potentiometer are used for additional factory adjustment of the switch point. Visual annunciators may be used to indicate the status of the incoming voltage. The overvoltage protection circuit has wider application as a circuit for generally sensing whether a line is low- or high-voltage.

BRIEF DESCRIPTION OF THE DRAWINGS

The invention will best be understood by reference to the accompanying drawings, wherein:

FIGS. 2A and 2B are alternative embodiments of overdriving circuits using the overvoltage protection circuit of the present invention to drive an incandescent light source in an overhead projector such as that of FIG. 1;

DESCRIPTION OF THE PREFERRED EMBODIMENT

Figure 1:
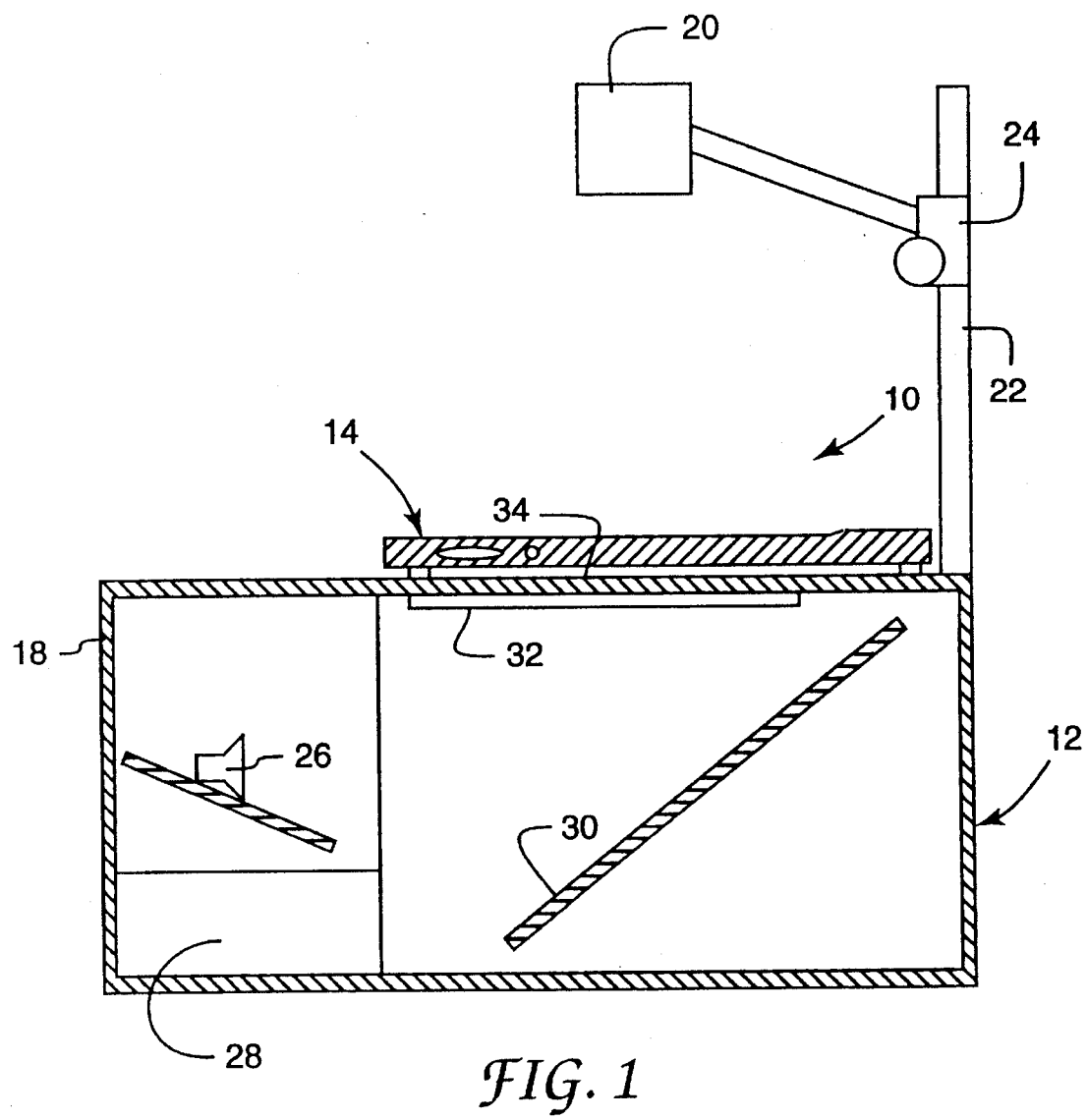
FIG. 1 is a perspective view of an overhead projector constructed in accordance with the present invention, including internal elements such as a light source and power supply.

With reference now to the figures, and in particular with reference to FIG. 1, there is depicted a presentation system 10 constructed in accordance with the present invention, generally comprised of an overhead projector (OHP) 12, and an optional liquid crystal display (LCD) panel 14. OHP 12 has all of the features of a conventional overhead projector, including a base 18 and a projection head 20 attached to base 18 by arm 22. Conventional adjustment means 24 are used to raise or lower head 20, i.e., move it toward or away from base 18. The depicted embodiment of OHP 12 is a transmissive-type projector, but those skilled in the art will appreciate that the present invention is equally useful in reflective-type OHP's, or incorporated into portable (collapsible) OHP's. Base 18 houses a light source 26, a power supply 28 for light source 26, and appropriate optical components (such as a mirror 30 and fresnel lens 32) for directing, collecting and collimating the light towards a stage 34 (a transparent sheet, e.g., glass). When an image is present on LCD panel 14, or when an image-bearing transparency film is placed on stage 34, the image is collected and projected (to a nearby projection screen or wall) by conventional optics located in head 20. A varifocal lens may be used (not shown) in head 20 in which case adjustment means 24 is not necessary. LCD panel 14 may be any conventional liquid crystal display panel. An exemplary LCD panel is sold by the Visual Systems Division of Minnesota Mining and Manufacturing Company (3M—assignee of the present invention) under model number 4180.

The present invention is directed to an OHP 12 which is designed for particularly bright output. The preferred form of light source 26 is therefore a high-intensity lamp, such as an EVD incandescent halogen bulb. The specific bulb presently used has a manufacturer's nominal voltage rating of 36 volts, meaning that its wattage and average life are based on this voltage source. In the present invention, however, the bulb voltage is overdriven to achieve a higher wattage. As mentioned above, overdriving the lamp usually shortens its life, but this is acceptable as long as the lamp can survive transient surges or sustained high ac line conditions. OHP 12 protects against such surges by providing an overvoltage protection circuit 36 in power supplies 28 and 28' as shown in the alternative embodiments of FIGS. 2A and 2B.

In each of these embodiments, the hot line 38 of a standard electric ac source 40 is connected to the input of overvoltage protection circuit 36 (it is understood that line 38 and source 40 do not constitute a part of the invention, but rather are external thereto, e.g., an electrical wall outlet). As explained further below, the circuit essentially acts as a relay to switch the ac power between direct connection with two outputs 42 and 44. These outputs are coupled to lamp 26 in such a manner that, when current flows through output 42, a lower nominal voltage is provided to the lamp, but when current flows through output 44, a higher nominal voltage is applied. "Nominal" voltage here refers to the voltage produced by power supply 28, 28' when the rms voltage at ac source 40 is approximately the rated voltage for the source. For example, in a system designed for the United States, a 120 volt ac signal applied through output 42 produces a 36 volt supply to lamp 26, but the same 120 volt ac signal applied through output 44 produces a 38 volt supply.

In the embodiment of FIG. 2A, this overdriving of lamp 26 is achieved by providing an autotransformer 46 whose output leads are connected to lamp 26, with outputs 42 and 44 of circuit 36 being connected at different tap locations along autotransformer 46. FIG. 2B illustrates one of many alternative circuits for applying the same voltage through two different outputs to produce different load voltages. In that figure, and instead of connecting the outputs 42 and 44 to different locations on the transformer, the two outputs are connected to a single transformer input, but a resistor 48 is provided along the low-voltage path with output 42. Autotransformer 46 has also been replaced with an isolated transformer 46.

Figure 3:
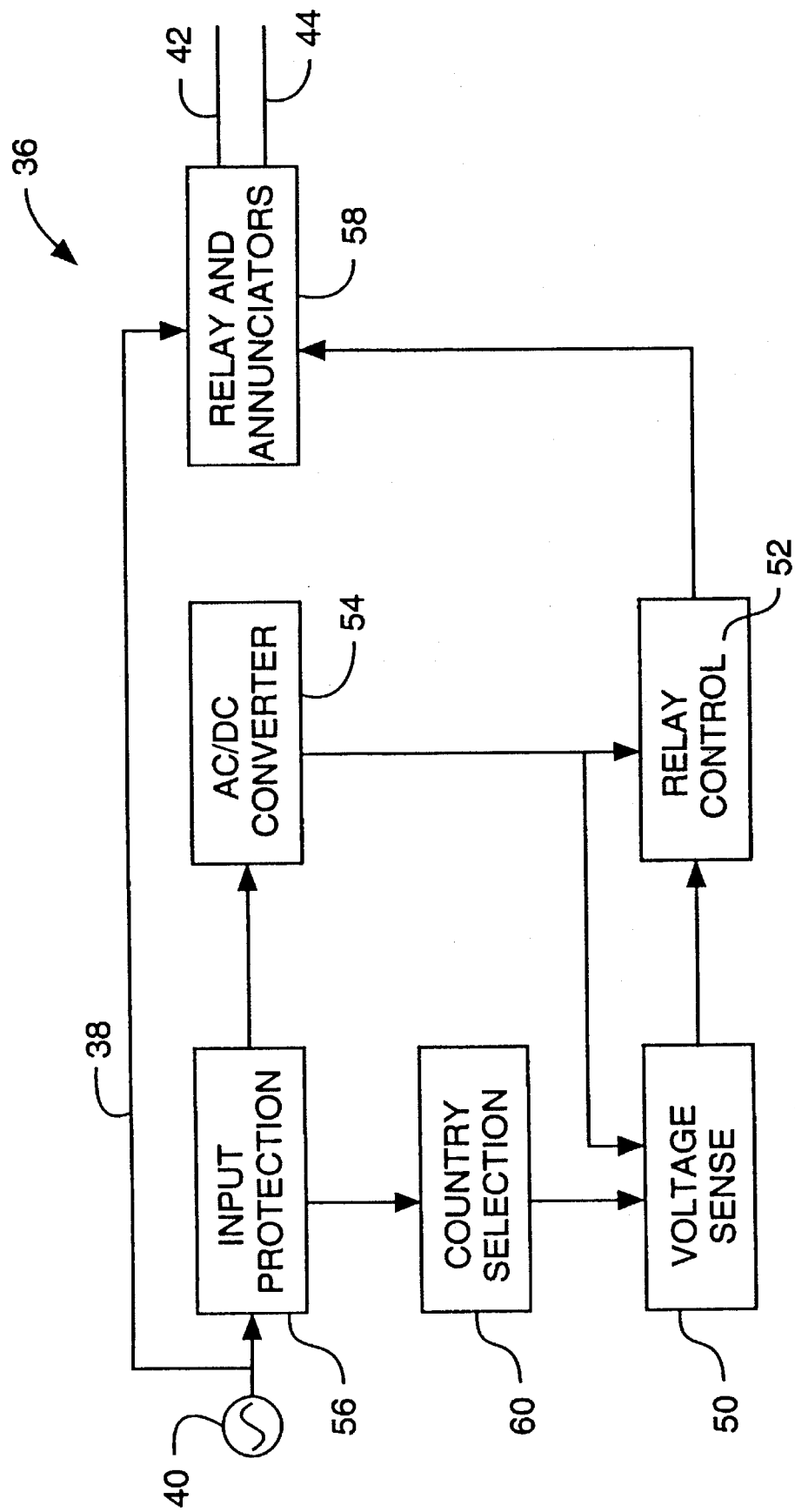
FIG. 3 is a block diagram of one embodiment of the overvoltage protection circuit of the present invention, illustrating control of a relay which switches between high and low output lines.

Referring now to FIG. 3, the essential elements of overvoltage protection circuit 36 are voltage sense and relay control circuits 50 and 52. As explained below in conjunction with FIG. 4, voltage sense circuit 50 detects whether a high-voltage condition exists on input line 38; its output is bipolar, indicating operation either below or above a predetermined threshold voltage or window. While the primary purpose of overvoltage protection circuit 36 is to control a surge on the line, it has an alternative use of determining which of two available voltages are present. As mentioned below, many countries provide electric power at more than one voltage. In using the novel overvoltage protection circuit 36 of the present invention, additional flexibility is imparted to any electrical device by allowing the power to be diverted appropriately to two different power conditioning circuits based on the sensed voltage value.

Voltage sense circuit 50 and relay control circuit 52 use a constant dc voltage, supplied by an ac/dc converter 54. In the preferred embodiment, input protection 56 is provided for circuit 36, to guard against catastrophic surges such as from lightning strikes, and to deal with possible shorts due to failure of ac/dc converter 54. The relay 58 may include visual annunciators which indicate whether current is flowing through output 42 or output 44. An optional country selection circuit 60 imparts additional flexibility by adjusting voltage sense circuit 50 to compensate for different voltage requirements of different countries.

Figure 4:
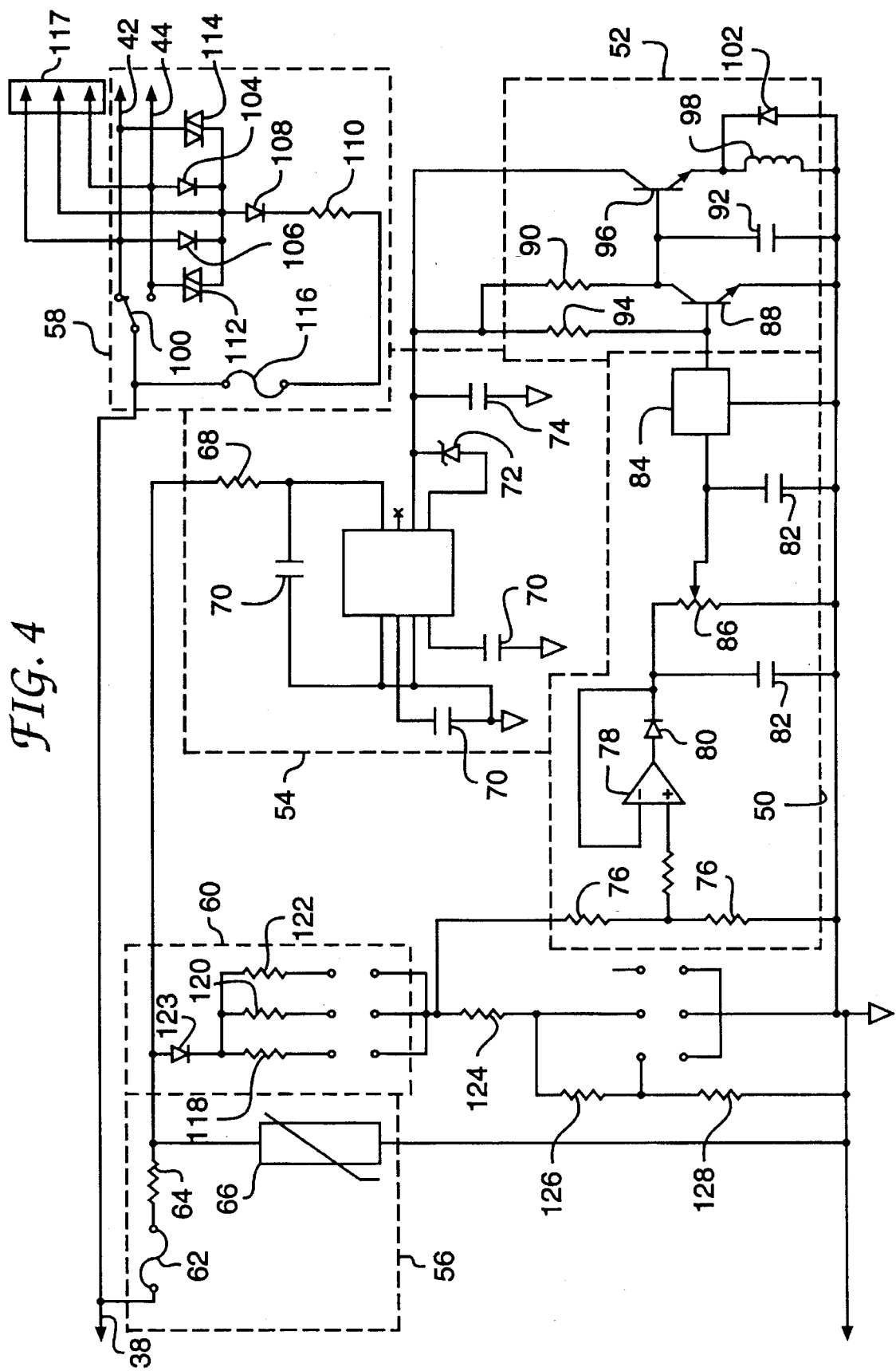
FIG. 4 is a detailed schematic of the presently preferred embodiment of the overvoltage protection circuit of the present invention depicting electrical components and their interconnections.

A detailed schematic of one embodiment of overvoltage protection circuit 36 is shown in FIG. 4. The input protection circuit 56 includes a fuse 62, a resistor 64, and a varistor 66 which forms a voltage-divider network with resistor 64 to shunt current in extremely high voltage surges. Fuse 62 serves not only to impart additional protection against such surges, but also to protect against failure of ac/dc converter 54. ac/dc converter 54 may be any reliable component which provides a stable dc voltage, such as the converter sold by American Telephone & Telegraph Co. under part number 2406 (21 volt output). Converter 54 is connected to input protection circuit 56 via a series resistor 68. Capacitors 70 are used to manage transients. A zener diode 72 provides feedback to regulate the dc output, and a filtering capacitor 74 further smoothes the voltage.

Voltage sense circuit 50 includes several resistors 76 which are used to set the switch point or threshold of the circuit, discussed further below. A peak detector is formed using a voltage follower 78 and rectifier 80. Capacitors 82 smooth the output of the peak detector, which is a dc signal whose value is proportional to the peak voltage from ac source 40. The peak detector output is fed to a non-adjusting voltage detector 84 which provides a low level output when the input is below a predetermined threshold, and a high level output when the threshold has been exceeded. An intervening potentiometer 86 provides further adjustment to the switch point, i.e., by raising or lowering the peak detector output with respect to the predetermined threshold of the voltage detector 84. In the preferred embodiment, the resistor values are selected to set a switch point at approximately 123.5 volts (for U.S. setting). Additional diodes (not shown) may be connected in parallel with the peak detector output to provide thermal stability. Another resistor (also not shown) may be placed in a network with potentiometer 86 to further compensate for thermal drifting. An rms voltage detector may be used in lieu of the peak detector.

Detector 84 advantageously has a hysteresis feature which improves performance of voltage sense circuit 50. Once detector 84 senses that the initial threshold voltage level has been exceeded, it temporarily resets the threshold to a lower value, so that it does not return to the low state until after the peak voltage of ac source 40 has dropped significantly below the original threshold. This prevents constant switching of the detector output when there are only minor variations in the ac source near the threshold value. The preferred embodiment uses a voltage detector available from Seiko Instruments under part number S-806(L). This component has a hysteresis about 0.115 volts dc. For a U.S. system operating around 120 volts, this corresponds to about a 7 volt hysteresis.

The output of detector 84 is fed to the gate of a first transistor 88 which is connected to a delay network comprised of a resistor 90 and a capacitor 92. The delay network stabilizes the internal circuitry and minimizes the inrush current to the lamp when the unit is first activated. A resistor 94 is used to bias the output of detector 84. When transistor 88 is not activated, it drives transistor 96 which energizes a solenoid 98 controlling the relay 100 in circuit 58 (the "second" state of the relay). Rectifier 102 quenches the back emf from solenoid 98. In the unenergized state, r[R]elay 100 is chosen to close the contact with output 42 [in the unenergized state] so that, if there is any failure in overvoltage protection circuit 36, the circuit will always revert to the safe state of providing lower voltage to lamp 26 (the "first" state of the relay) lamp 26.

Two visual annunciators, preferably light-emitting diodes (LED's) 104 and 106, are connected to output lines 42 and 44, respectively, to indicate the status of the relay. Green LED 104 is illuminated whenever relay 100 is energized, i.e., when the ac source voltage is below the threshold. In the application of OHP 12, this means that the circuit is switching to output 44 and overdriving the lamp. If the ac source voltage should exceed the threshold, then red LED 106 is illuminated, indicating an overvoltage condition on the ac source, and switching to output 42 to temporarily cease overdriving the lamp. A rectifier 108 and a resistor 110 are used to limit voltage to the LED's. Diac's 112 and 114, as well as fuse 116, provide additional protection to the LED's. A test jack 117 may be provided to allow a field technician to connect another LED similar to LED 106 but with long leads such that it can be placed outside of the OHP and viewed while depressing the on/off power switch. This enable the technician to tell whether the circuit is operating properly.

Additional flexibility may be built into overvoltage protection circuit 36 by providing means for selecting different switch points based on different voltages found in the standard power outlets in various countries. In the preferred embodiment, this is accomplished by providing a country selection circuit 60 having several resistors 118, 120 and 122, one of which is selected with the use of a jumper or paired contact element, and a rectifier 123. One of the resistors, for example 118, may be selected for U.S. systems where the standard voltage is 120 volts. Another resistor, e.g., 120, may be selected for outside the U.S., where the standard voltage is 230 volts. A special jumper may be provided for any country wherein more than one voltage rating is available. For example, resistor 122 is selected to provide discrimination between voltages of 100 or 220 volts as found in South Korea. In this regard, those skilled in the art will appreciate that the basic circuit of FIG. 4 may be used without overdriving. For the Korean application, the circuit is actually used as a sensor to determine which voltage is present, and it then conducts the power through the appropriate output line 42 or 44, which leads to two different power conditioning circuits. Additional sensitivity can be achieved, for example through final factory adjustment, using another jumper to selected a voltage-divider network having different combinations of resistors 124, 126 and 128. The preferred PCB (printed circuit board) layout provides for jumper connection, with the default setting (i.e., no jumper present) resulting in a simple series connection of all of the resistors 124, 126, and 128 (this is the setting associated with the lowest switch point value, i.e., the safest setting). Overvoltage protection circuit 36 is relatively low-cost and easily senses low and high-voltage stages anywhere between 90–260 volts. The entire circuit may easily be encapsulated (potted) for environmental protection, particularly thermal stability.

Figure 5:
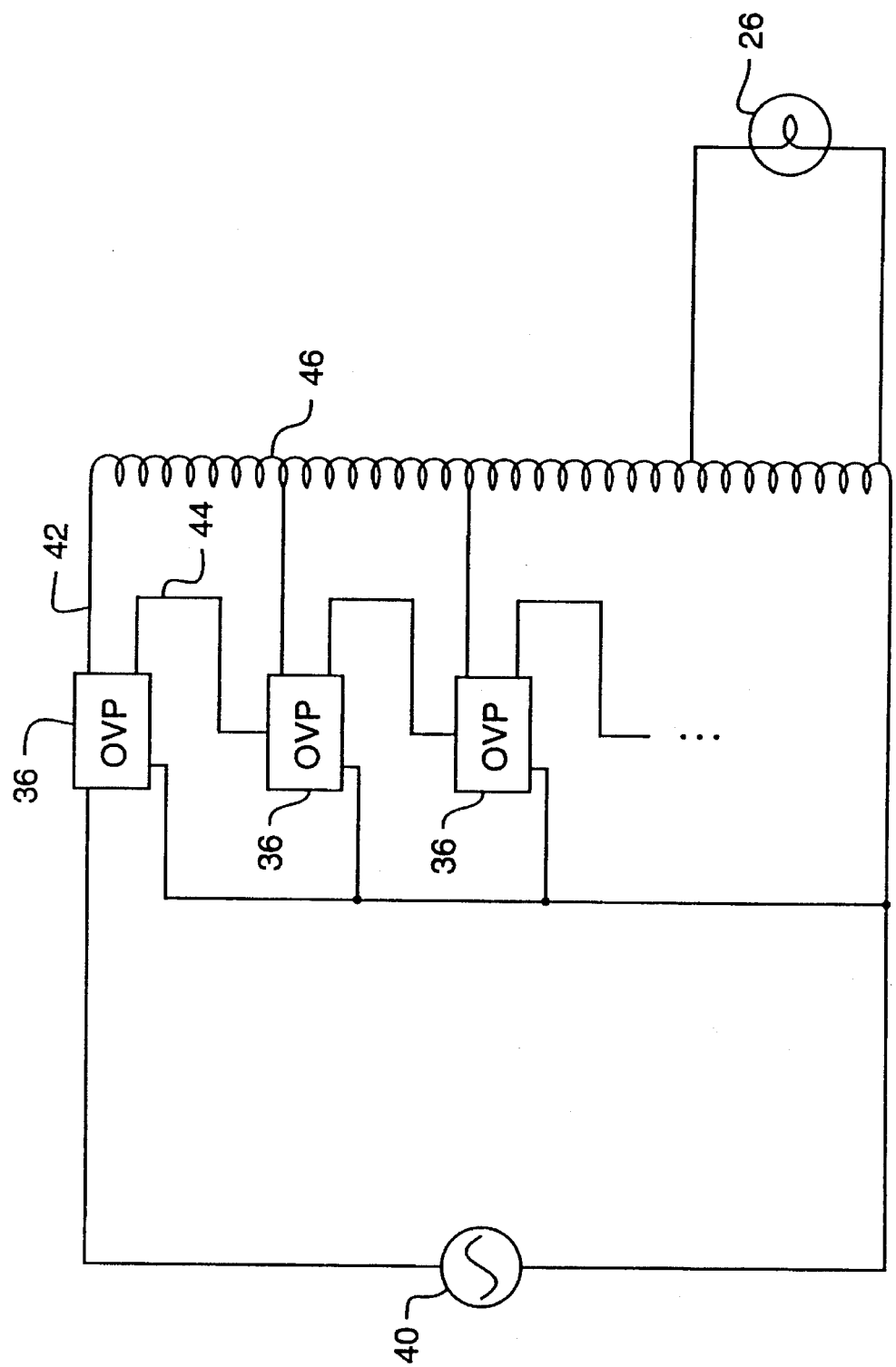
FIG. 5 is a block diagram of a circuit containing a bank of overvoltage protection circuits according to the present invention, used for detecting a wider range of input voltages and providing more than just bipolar (high and low) output lines.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. For example, FIG. 5 depicts an interesting use of the present invention wherein a bank of overvoltage protection devices are provided to yield selection of more than just bipolar states, i.e., a wide range of voltages may be detected and routed to provide different final outputs. It is therefore contemplated that such modifications can be made without departing from the spirit or scope of the present invention as defined in the appended claims.

I claim:

1. An apparatus for detecting a high-voltage condition of an alternating-current (ac) voltage source, and adapted for driving a load at two different voltages, the apparatus comprising:

an input line for connection to the ac voltage source;

a first output line;

a second output line;

switch means for selectively connecting either said first output line or said second output line to said input line;

means for generating a direct-current (dc) output whose voltage is based on the ac voltage source;

means for comparing said dc output voltage to a predetermined threshold voltage;

means, connected to said comparing means, for controlling said switch means;

a load line; and means for coupling said first and second output lines to said load such that the ac voltage source, when applied to said first output line, will produce a lower voltage at said load line than that produced when the ac voltage source is applied to said second output line, said switch means having a first state wherein said input line is connected to said first output line, and a second state wherein said input line is connected to said second output line, said switch means being in said first state when said dc output voltage exceeds said predetermined threshold voltage.

2. The apparatus of claim 1 wherein said comparing means initially sets said predetermined threshold voltage at a first voltage level, and thereafter sets said predetermined threshold voltage at a second voltage level, which is lower than said first voltage level, when said dc output voltage exceeds said first voltage level.

3. The apparatus of claim 1 further comprising means for manually adjusting said predetermined threshold voltage to one of a plurality of differing voltage levels.

4. The apparatus of claim 1 further comprising means for visually indicating whether said input line has been switched to said first output line or said second output line.

5. The apparatus of claim 1 wherein said coupling means includes a transformer having multiple taps, said first and second output lines being connected to different taps.

6. The apparatus of claim 2 wherein said comparing means resets said predetermined threshold voltage to said first voltage level when said dc output voltage drops below said second voltage level.

7. A power supply adapted to provide two different alternating-current voltages to a load, comprising:

an input line for connection to an external ac voltage source;

a first output line;

a second output line;

switch means for selectively connecting either said first output line or said second output line to said input line;

means for generating a direct-current (dc) output whose voltage is based on the ac voltage source;

means for driving said switch means to connect said input line to said first output line when said dc output voltage exceeds a predetermined threshold voltage;

a load line; and means for coupling said first and second output lines to said load line such that the ac voltage source, when applied to said first output line, will produce a lower voltage at said load line than that produced when the ac voltage source is applied to said second output line.

8. The power supply of claim 7 wherein said driving means includes:

means for determining whether said dc output voltage is above said predetermined threshold voltage, said determining means having low and high states, said low state occurring when said dc output voltage is below said predetermined threshold voltage, and said high state occurring when said dc output voltage is above said predetermined threshold voltage; and means, connected to said determining means, for controlling said switch means.

9. The power supply of claim 7 further comprising means for manually adjusting said predetermined threshold voltage to one of a plurality of differing voltage levels associated with standard electric outlets.

10. The power supply of claim 7 further comprising annunciator means for visually indicating whether said input line has been switched to said first output line or said second output line.

11. The power supply of claim 7 wherein said coupling means includes a transformer having multiple taps, said first and second output lines being connected to different taps.

12. The power supply of claim 7 wherein said switch means includes means for connecting said input line to said first output line if either of said generating means or said driving means should fail.

13. The power supply of claim 8 wherein said determining means includes means for delaying switching from between said states for a predetermined time after said external voltage source is first connected to said input line.

14. The power supply of claim 8 wherein said determining means initially sets said predetermined threshold voltage at a first voltage level, and thereafter sets said predetermined threshold voltage at a second voltage level, which is lower than said first voltage level, when said dc output voltage exceeds said first voltage level.

15. The power supply of claim 14 wherein said determining means resets said predetermined threshold voltage to said first voltage level when said dc output voltage drops below said second voltage level.

16. A presentation system including an overhead projector having a base, a stage area, a light source directing light toward said stage area, a power supply for said light source, and a projection head mounted on said base including means for collecting light from said stage area and projecting the collected light, characterized in that said power supply comprises an input line for connection to an external ac voltage source;

a first output line;

a second output line;

switch means for selectively connecting either said first output line or said second output line to said input line;

means for generating a direct-current (dc) output whose voltage is based on the ac voltage source;

means for comparing said dc output voltage to a predetermined threshold voltage; and means, connected to said comparing means, for controlling said switch means;

a load line connected to said light source; and means for coupling said first and second output lines to said load line such that the ac voltage source, when applied to said first output line, will produce a lower voltage at said load line than that produced when the ac voltage source is applied to said second output line, said switch means having a first state wherein said input line is connected to said first output line, and a second state wherein said input line is connected to said second output line, said switch means being in said first state when said dc output voltage exceeds said predetermined threshold voltage.

17. The presention system of claim 16 further comprising means for manually adjusting said predetermined threshold voltage to one of a plurality of differing voltage levels associated with standard electric outlets.

18. The presention system of claim 16 wherein said coupling means includes a transformer having multiple taps, said first and second output lines being connected to different taps.

19. The presentation system of claim 16 wherein said comparing means initially sets said predetermined threshold voltage at a first voltage level, and thereafter sets said predetermined threshold voltage at a second voltage level, which is lower than said first voltage level, when said dc output voltage exceeds said first voltage level, and said comparing means further resets said predetermined threshold voltage to said first voltage level when said dc output voltage drops below said second voltage level.

* * * * *